US009259643B2

(12) United States Patent
Lansdale et al.

(10) Patent No.: US 9,259,643 B2
(45) Date of Patent: Feb. 16, 2016

(54) CONTROL OF SEPARATE COMPUTER GAME ELEMENTS

(75) Inventors: Thomas William Lansdale, Guildford (GB); Charles Robert Griffiths, Guildford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 485 days.

(21) Appl. No.: 13/237,584

(22) Filed: Sep. 20, 2011

(65) Prior Publication Data

US 2012/0276994 A1    Nov. 1, 2012

Related U.S. Application Data

(60) Provisional application No. 61/480,062, filed on Apr. 28, 2011.

(51) Int. Cl.
*A63F 13/06* (2006.01)
*A63F 13/20* (2014.01)
*A63F 13/40* (2014.01)

(52) U.S. Cl.
CPC .............. *A63F 13/06* (2013.01); *A63F 13/10* (2013.01); *A63F 2300/1093* (2013.01); *A63F 2300/6045* (2013.01); *A63F 2300/6607* (2013.01)

(58) Field of Classification Search
CPC . A63F 13/00; A63F 13/06; A63F 2300/6607; A63F 13/10; G06F 3/017; H04L 67/22
USPC ....................................................... 463/36, 31
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CA    2753051 A1    9/2010
CN    1919389 A    2/2007
(Continued)

OTHER PUBLICATIONS

GameSpot: EyeToy Play Review, pp. 1-2, http://www.gamespot.com/ps2/action/eyetoy/review.html?sid=6078136&print=1, Sep. 17, 2007.*

(Continued)

*Primary Examiner* — David L Lewis
*Assistant Examiner* — Shauna-Kay Hall
(74) *Attorney, Agent, or Firm* — Aaron Chatterjee; Kate Drakos; Micky Minhas

(57) ABSTRACT

Control of separate computer game elements is described. In one example, a computer game system displays a computer game to a user, the computer game comprising at least one avatar and an environment. Manual input commands are received from a hand-operated controller operated by the user, and are used to control the display of the avatar in the computer game. Substantially concurrently with the manual input, a stream of images from an image capture device depicting the user is also received. A portal, separate to the avatar, is displayed in a region of the computer game display, which shows the received stream of images to the user. The stream of images of the user is analyzed and a gesture performed by the user is recognized. The recognized gesture is used to control displayed interaction between the portal and the environment.

20 Claims, 9 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |

(56) References Cited

U.S. PATENT DOCUMENTS

| | | | |
|---|---|---|---|
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,009,022 | B2* | 8/2011 | Kipman et al. ............ 340/407.1 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0041327 | A1* | 4/2002 | Hildreth et al. ................. 348/42 |
| 2005/0059488 | A1 | 3/2005 | Larsen et al. |
| 2005/0215319 | A1* | 9/2005 | Rigopulos et al. ............. 463/32 |
| 2006/0035710 | A1* | 2/2006 | Festejo et al. .................. 463/36 |
| 2006/0046846 | A1* | 3/2006 | Hashimoto ..................... 463/36 |
| 2007/0060336 | A1* | 3/2007 | Marks et al. .................... 463/30 |
| 2008/0026838 | A1 | 1/2008 | Dunstan et al. |
| 2008/0158232 | A1* | 7/2008 | Shuster ......................... 345/474 |
| 2008/0215974 | A1* | 9/2008 | Harrison et al. ............. 715/706 |
| 2008/0242409 | A1 | 10/2008 | Schueller |
| 2008/0280684 | A1 | 11/2008 | McBride et al. |
| 2009/0048021 | A1 | 2/2009 | Lian et al. |
| 2009/0150802 | A1 | 6/2009 | Do et al. |
| 2009/0209343 | A1* | 8/2009 | Foxlin et al. ................... 463/36 |
| 2009/0221374 | A1* | 9/2009 | Yen et al. ........................ 463/42 |
| 2009/0231425 | A1 | 9/2009 | Zalewski |
| 2009/0258703 | A1* | 10/2009 | Brunstetter .................... 463/36 |
| 2009/0271821 | A1 | 10/2009 | Zalewski |
| 2010/0203969 | A1* | 8/2010 | Takahashi et al. ............. 463/32 |
| 2010/0302015 | A1 | 12/2010 | Kipman et al. |
| 2010/0302253 | A1 | 12/2010 | Kipman et al. |
| 2010/0306715 | A1 | 12/2010 | Geisner et al. |
| 2011/0007079 | A1 | 1/2011 | Perez et al. |
| 2011/0098109 | A1* | 4/2011 | Leake et al. .................... 463/30 |
| 2011/0250962 | A1* | 10/2011 | Feiner et al. ................... 463/31 |
| 2012/0088581 | A1 | 4/2012 | Mao et al. |

FOREIGN PATENT DOCUMENTS

| | | |
|---|---|---|
| CN | 201254344 B | 6/2010 |
| EP | 0583061 A2 | 2/1994 |
| EP | 2079004 A1 | 7/2009 |
| JP | 08044490 A1 | 2/1996 |
| JP | 2008073184 A | 4/2008 |
| KR | 1020110002102 A | 1/2011 |
| WO | 93/10708 A1 | 6/1993 |
| WO | 97/17598 A1 | 5/1997 |
| WO | 99/44698 A1 | 9/1999 |
| WO | 2007038622 A2 | 5/2007 |

OTHER PUBLICATIONS

Jose L. Bernardes, et al, "Design and implementation of a flexible hand gesture command interface for games based on computer vision", VIII Brazilian Symposium on Games and Digital Entertainment, Oct. 2009, pp. 1-10, Rio de Janeiro, Brazil.

Stephen Totilo, "Kung Fu Live Is The Best Kinect Game on PlayStation 3", Sep. 2010, pp. 1-3, http://kotaku.com/5630997/kung-fu-live-is-the-best-kinect-game-on-playstation-3.

"International Search Report", Mailed Date: Nov. 20, 2012, Application No. PCT/US2012/034695, Filed Date: Apr. 23, 2012, pp. 13.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

(56) References Cited

OTHER PUBLICATIONS

"Simulation and Training", 1994, Division Incorporated.
"First Office Action and Search Report Issued in Chinese Patent Application No. 201280019756.X", Mailed Date: Mar. 12, 2015, 12 Pages.
"Search Report Issued in European Patent Application No. 12776599.8", Mailed Date: Sep. 17, 2014, 3 Pages.
"Office Action Issued in European Patent Application No. 12776599.8", Mailed Date: Dec. 4, 2014, 5 Pages.
"Second Office Action Received for Chinese Patent Application No. 201280019756.X", Mailed Date: Sep. 28, 2015, 6 Pages.

* cited by examiner

CONTROL OF SEPARATE COMPUTER GAME ELEMENTS

CROSS-REFERENCE TO RELATED APPLICATION

This non-provisional utility application claims priority to U.S. provisional application Ser. No. 61/480,062, entitled "Control of Separate Computer Game Elements" and filed on Apr. 28, 2011, which is incorporated herein in its entirety by reference.

BACKGROUND

Existing video and computer game control systems use hand held controllers which incorporate buttons and joysticks to enable a player to control an avatar or other objects depicted at a game display. Design of these types of hand held controllers seeks to enable fine grained control of game play in robust, easy to use and intuitive manners.

More recently, some computer game control systems use voice recognition technology and gesture recognition to enable a player to control a game interface. In this situation gamers have no hand held controller and are able to interact with the game in a straightforward manner without being restricted by physical user input devices such as hand held controllers.

The embodiments described below are not limited to implementations which solve any or all of the disadvantages of known game control systems

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Control of separate computer game elements is described. In one example, a computer game system displays a computer game to a user, the computer game comprising at least one avatar and an environment. Manual input commands are received from a hand-operated controller operated by the user, and are used to control the display of the avatar in the computer game. Substantially concurrently with the manual input, a stream of images from an image capture device depicting the user is also received. A portal, separate to the avatar, is displayed in a region of the computer game display, which shows the received stream of images to the user. The stream of images of the user is analyzed and a gesture performed by the user is recognized. The recognized gesture is used to control displayed interaction between the portal and the environment.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a game system for two dimensional side-scrolling platformer games, the system described is provided as an example and not a limitation. As those skilled in the art will appreciate, the present examples are suitable for application in a variety of different types of game systems.

Figure 1:
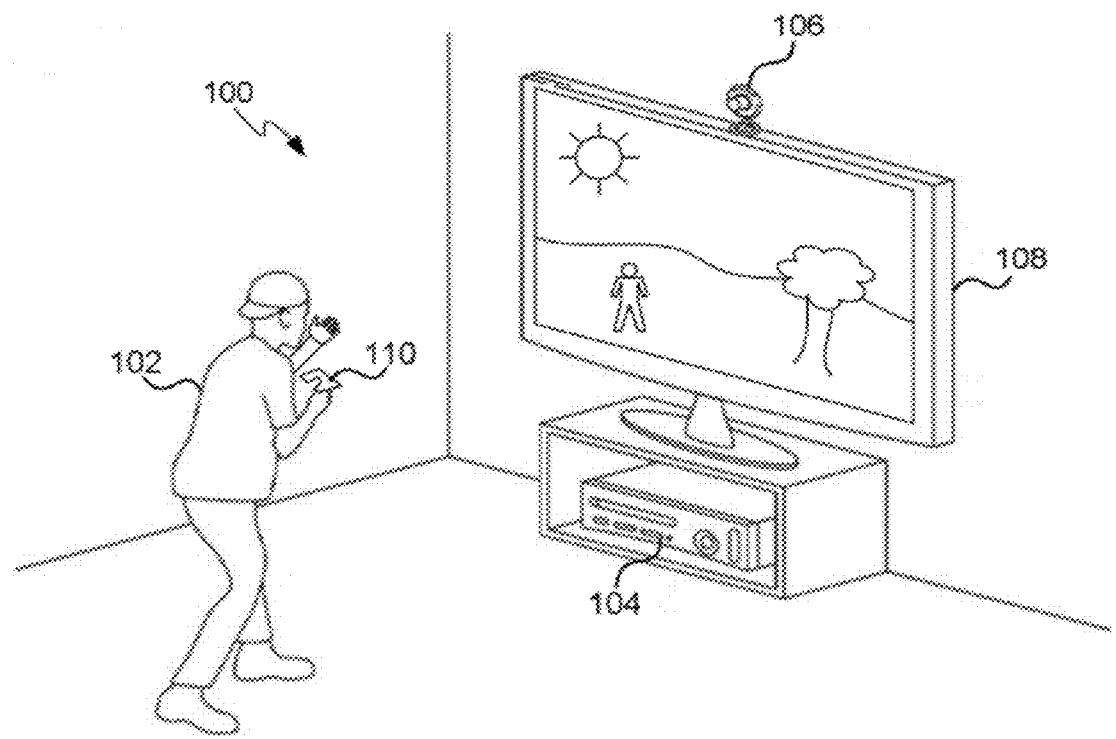
FIG. 1 is a schematic diagram of a player holding a game controller and gesturing before a game apparatus having a depth camera.

Reference is first made to FIG. 1, which illustrates an example control system 100 for controlling a computer game. In this example, the control system comprises both a hand-held controller and a camera-based control system. By integrating both types of control a game player experiences the benefits of both types of control system. Integration is achieved as described herein to enable fine grained control of game systems in a robust, easy to use manner which enhances the player experience. FIG. 1 shows a user 102 playing, in this illustrative example, a two dimensional side-scrolling platformer game. This type of game is may be clearly depicted in two dimensional drawings; however, the methods described herein are also applicable to three dimensional games, augmented reality applications and games of other types. In some examples, camera-based control system 100 can be used to, among other things, determine body pose, bind, recognize, analyze, track, associate to a human target, provide feedback, and/or adapt to aspects of a human target such as user 102 (also referred to herein as a player). In this example one player is depicted for clarity. However, two or more players may also use the control system at the same time.

The camera-based control system 100 comprises a computing device 104. The computing device 104 can be a general purpose computer, gaming system or console, or dedicated image processing device. The computing device 104 can include hardware components and/or software components such that the computing device 104 can be used to execute applications such as gaming applications and/or nongaming applications. The structure of the computing device 104 is discussed hereinafter with reference to FIG. 9.

The camera-based control system 100 further comprises a capture device 106. The capture device 106 can be, for example, an image sensor or detector that can be used to visually monitor one or more users (such as user 102) such that gestures performed by the one or more users can be captured, analyzed, processed, and tracked to perform one or more controls or actions within a game or application, as described in more detail below.

The camera-based control system 100 can further comprise a display device 108 connected to the computing device 104. The display device can be a television, a monitor, a high-definition television (HDTV), or the like that can provide game or application visuals (and optionally audio) to the user 102.

In operation, the user 102 can be tracked using the capture device 106 such that the position, movements and size of user 102 can be interpreted by the computing device 104 (and/or the capture device 106) as controls that can be used to affect the application being executed by computing device 104. As a result, the user 102 can move his or her body (or parts of his or her body) to control an executed game or application.

In the illustrative example of FIG. 1, the application executing on the computing device 104 is a two dimensional side-scrolling platformer game that the user 102 is playing. In this example, the computing device 104 controls the display device 108 to provide a visual representation of a terrain comprising a landscape, tree, and the sun to the user 102. The computing device 104 also controls the display device 108 to provide a visual representation of a user avatar that the user 102 can control with his or her movements and/or by using a hand held controller 110. For example, the computing device 104 can comprise a body pose estimator that is arranged to recognize and track different body parts of the user, and map these onto the avatar. In this way, the avatar copies the movements of the user 102 such that if the user 102, for example walks in physical space, this causes the user avatar to walk in game space.

However, only copying user movements in game space limits the type and complexity of the interaction between the user and the game. For example, many in-game controls are momentary actions or commands, which may be triggered using button presses in traditional gaming systems. Examples of these include actions such as punch, shoot, change weapon, throw, kick, jump, and/or crouch. Such actions or commands may be controlled by recognizing that the user is performing one of these actions and triggering a corresponding in-game action, rather than merely copying the user's movements. In addition, combinations of user inputs at the hand held controller and user inputs via the camera-based control system may be used to control the game apparatus.

Figure 2:
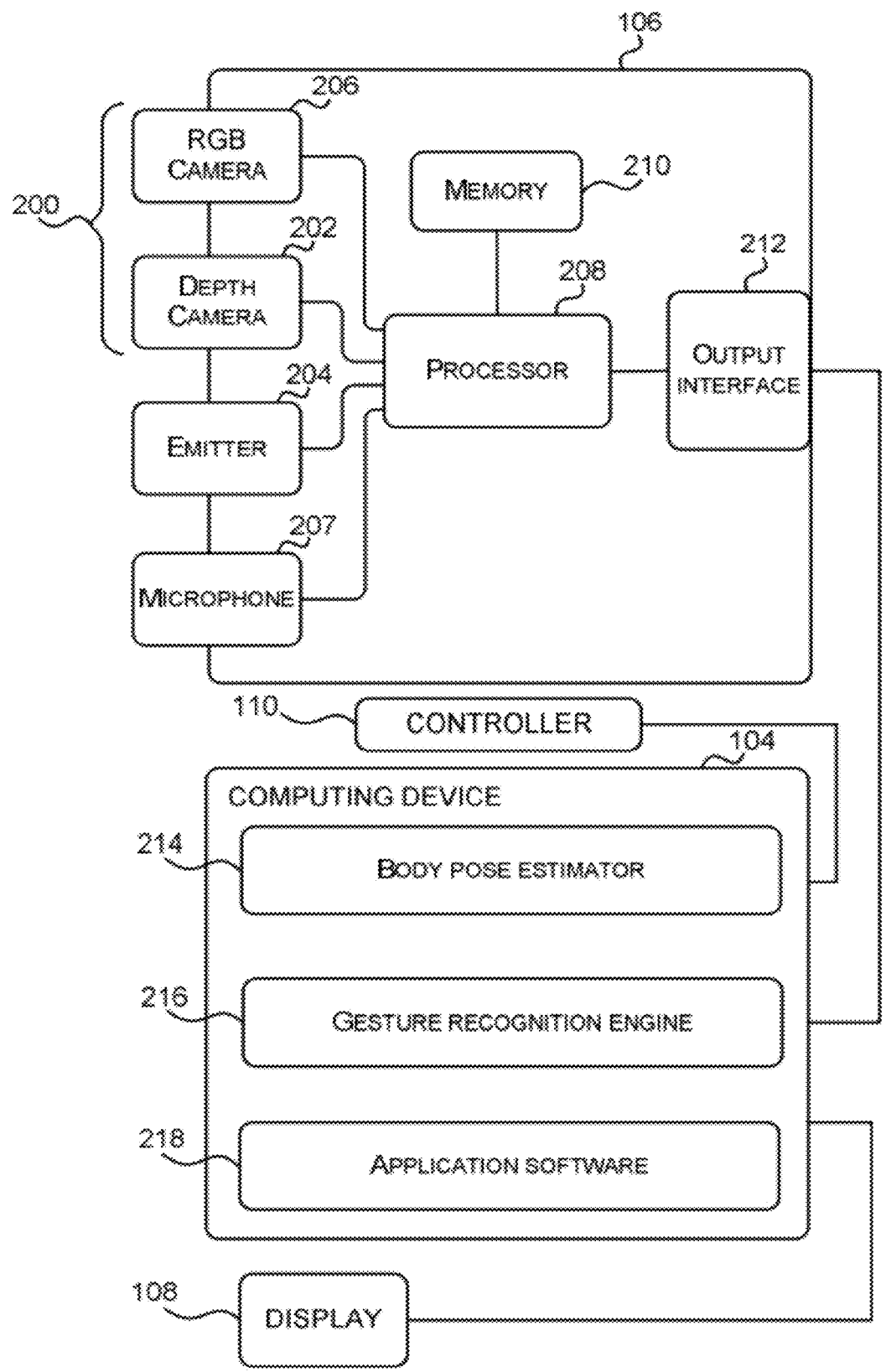
FIG. 2 is a schematic diagram of a game system incorporating an image capture device, a hand held controller, a computing device and a display.

Reference is now made to FIG. 2, which illustrates a schematic diagram of the capture device 106 that can be used in the camera-based control system 100 of FIG. 1. In the example of FIG. 2 the capture device 106 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element. Note that the term "image element" is used to refer to a pixel, group of pixels, voxel, group of voxels or other higher level component of an image.

The depth information can be obtained using any suitable technique including, for example, time-of-flight, structured light, stereo image, or the like. In some examples, the capture device 106 can organize the depth information into "Z layers," or layers that may be perpendicular to a Z-axis extending from the depth camera along its line of sight.

As shown in FIG. 2, the capture device 106 comprises at least one imaging sensor 200. In the example shown in FIG. 2, the imaging sensor 200 comprises a depth camera 202 arranged to capture a depth image of a scene. The captured depth image can include a two-dimensional (2-D) area of the captured scene where each image element in the 2-D area represents a depth value such as a length or distance of an object in the captured scene from the depth camera 202.

The capture device can also include an emitter 204 arranged to illuminate the scene in such a manner that depth information can be ascertained by the depth camera 202. For example, in the case that the depth camera 202 is an infra-red (IR) time-of-flight camera, the emitter 204 emits IR light onto the scene, and the depth camera 202 is arranged to detect backscattered light from the surface of one or more targets and objects in the scene. In some examples, pulsed infrared light can be emitted from the emitter 204 such that the time between an outgoing light pulse and a corresponding incoming light pulse can be detected by the depth camera and measured and used to determine a physical distance from the capture device 106 to a location on the targets or objects in the scene. Additionally, in some examples, the phase of the outgoing light wave from the emitter 204 can be compared to the phase of the incoming light wave at the depth camera 202 to determine a phase shift. The phase shift can then be used to determine a physical distance from the capture device 106 to a location on the targets or objects. In a further example, time-of-flight analysis can be used to indirectly determine a physical distance from the capture device 106 to a location on the targets or objects by analyzing the intensity of the reflected beam of light over time via various techniques including, for example, shuttered light pulse imaging.

In another example, the capture device 106 can use structured light to capture depth information. In such a technique, patterned light (e.g., light displayed as a known pattern such as spot, grid, or stripe pattern, which may also be time-varying) can be projected onto the scene using the emitter 204. Upon striking the surface of one or more targets or objects in the scene, the pattern becomes deformed. Such a deformation of the pattern can be captured by the depth camera 202 and then be analyzed to determine a physical distance from the capture device 106 to a location on the targets or objects in the scene.

In another example, the depth camera 202 can be in the form of two or more physically separated cameras that view a scene from different angles, such that visual stereo data is obtained that can be resolved to generate depth information. In this case the emitter 204 can be used to illuminate the scene or can be omitted.

In some examples, in addition or alterative to the depth camera 202, the capture device 106 can comprise a video camera, which is referred to as an RGB camera 206. The RGB camera 206 is arranged to capture sequences of images of the scene at visible light frequencies, and can hence provide images that can be used to augment the depth images. In some examples, the RGB camera 206 can be used instead of the depth camera 202. The capture device 106 can also optionally comprise a microphone 207 or microphone array (which can be directional and/or steerable), which is arranged to capture sound information such as voice input from the user and can be used for speech recognition.

The capture device 106 shown in FIG. 2 further comprises at least one processor 208, which is in communication with the imaging sensor 200 (i.e. depth camera 202 and RGB camera 206 in the example of FIG. 2), the emitter 204, and the microphone 207. The processor 208 can be a general purpose microprocessor, or a specialized signal/image processor. The processor 208 is arranged to execute instructions to control the imaging sensor 200, emitter 204 and microphone 207 to capture depth images, RGB images, and/or voice signals. The processor 208 can also optionally be arranged to perform processing on these images and signals, as outlined in more detail hereinafter.

The capture device 106 shown in FIG. 2 further includes a memory 210 arranged to store the instructions that for execution by the processor 208, images or frames of images captured by the depth camera 202 or RGB camera 206, or any other suitable information, images, or the like. In some examples, the memory 210 can include random access memory (RAM), read only memory (ROM), cache, Flash memory, a hard disk, or any other suitable storage component. The memory 210 can be a separate component in communication with the processor 208 or integrated into the processor 208.

The capture device 106 also comprises an output interface 212 in communication with the processor 208 and is arranged to provide data to the computing device 104 via a communication link. The communication link can be, for example, a wired connection (such as USB, Firewire, Ethernet or similar) and/or a wireless connection (such as WiFi, Bluetooth® or similar). In other examples, the output interface 212 can interface with one or more communication networks (such as the internet) and provide data to the computing device 104 via these networks.

A controller 110 is also provided as part of the camera-based control system. The controller may be a hand held controller as depicted schematically in FIG. 1 or may be integral with another larger device that is not hand held. The controller comprises a plurality of user input devices such as buttons, joysticks, touch pads, switches and enables a player to make input to a game system. User input data is sent from the controller to the computing device 104 by a wired connection and/or a wireless connection.

The computing device 104 executes a number of functions relating to the camera-based gesture recognition, such as an optional body pose estimator 214 and a gesture recognition engine 216. The body pose estimator 214 is arranged to use computer vision techniques to detect and track different body parts of the user. An example of a body pose estimator is given in US patent publication US-2010-0278384-A1 "Human body pose estimation" filed 20 May 2009. The body pose estimator 214 can provide an output to the gesture recognition engine in the form of a time-series of data relating to the user's body pose. This can be in the form of a fully tracked skeletal model of the user, or a more coarse identification of the visible body parts of the user. For example, these time-series sequences can comprise data relating to a time-varying angle between at least two body parts of the user, a rate of change of angle between at least two body parts of the user, a motion velocity for at least one body part of the user, or a combination thereof. The different types of data (angles between certain body parts, velocities, etc.) are known as "features". In other examples, the body pose estimator 214 can derive other data sequences (i.e. other features) from the changing pose of the user over time. In further examples, the gesture recognition engine 216 can utilize input (i.e. features) derived from different sources other than the body pose estimator. Application software 218 can also be executed on the computing device 104 and controlled using the gestures. The application software is arranged to control display of the game at a display 108.

Figure 3:
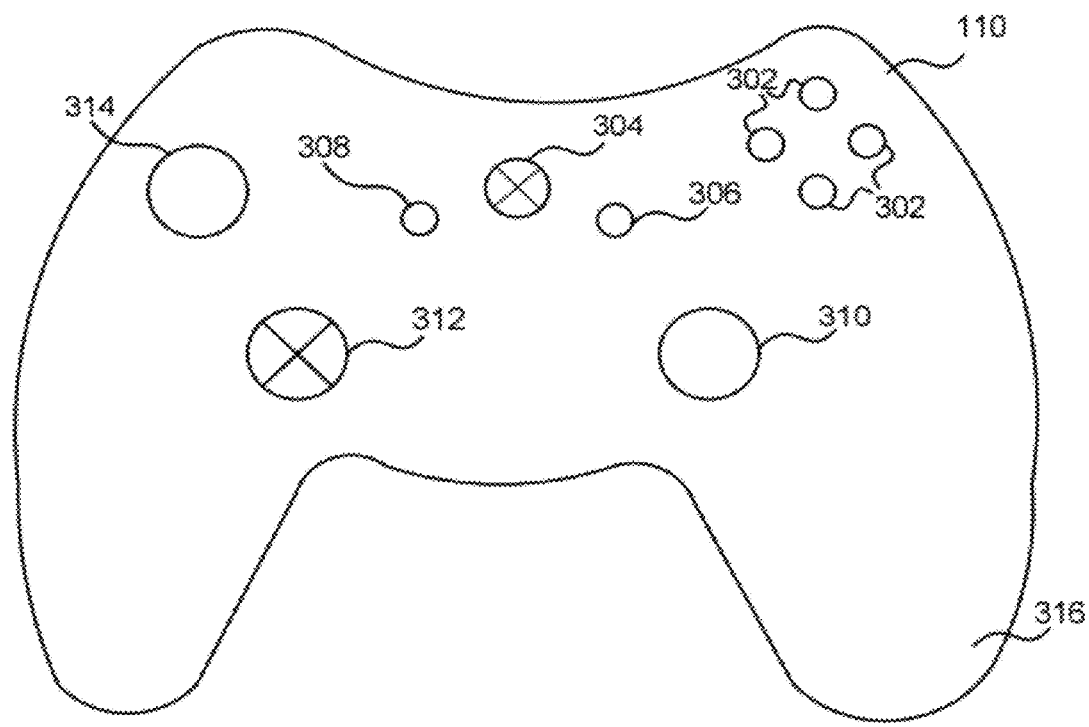
FIG. 3 is a plan view of a hand held controller.

FIG. 3 is a plan view of an example hand held controller 110. It has a generally winged shape with each wing or shoulder 122 being 316 being sized and shaped to be clasped in one hand. The controller comprises a housing supporting a plurality of buttons, switches and joysticks as now described in more detail. However, this is an example only and other types of controller 110 may be used.

Four digital action buttons 302 are provided on the right face of the controller comprising a green A button, red B button, blue X button and amber Y button. Two analog joysticks 310 and 312 are provided. These joysticks may also be depressed or clicked in to active a digital button beneath each joystick. Digital start 306, back 308 and guide 304 buttons are centrally positioned on the housing. For example, the guide button is used to turn on the controller and access a menu.

Figure 4:
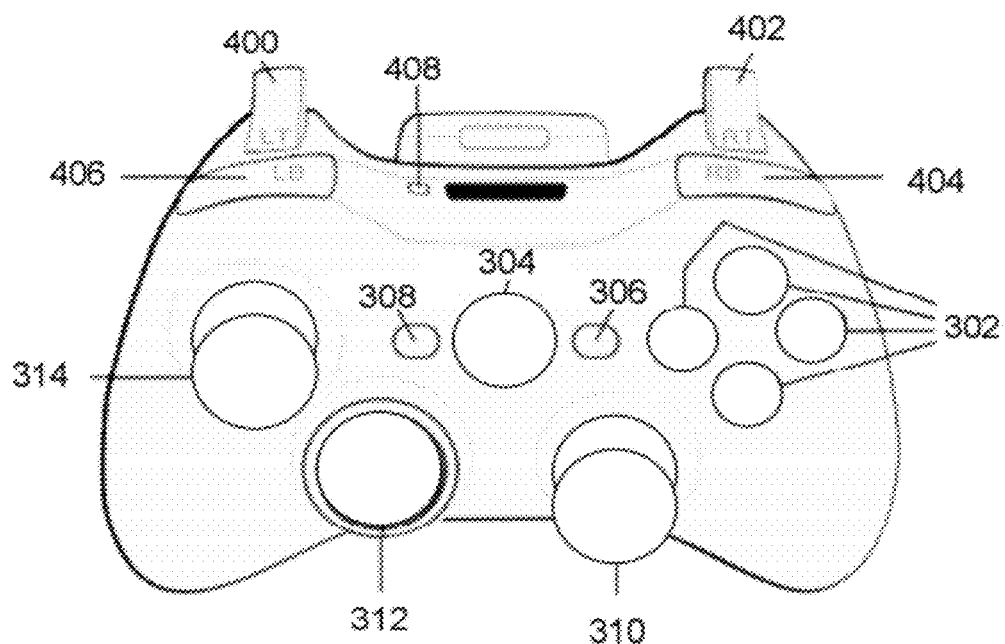
FIG. 4 is a perspective view of the hand held controller of FIG. 3.

FIG. 4 is a perspective view of the controller and shows a left bumper 406 and a right bumper 404 each of which are buttons that may be pressed by the user. A left trigger 400 and a right trigger 402 which are both analog are given on the underside of the controller (visible in FIG. 4). A connector 408 may be provided to enable wired connection to the computing device 104.

Figure 5:
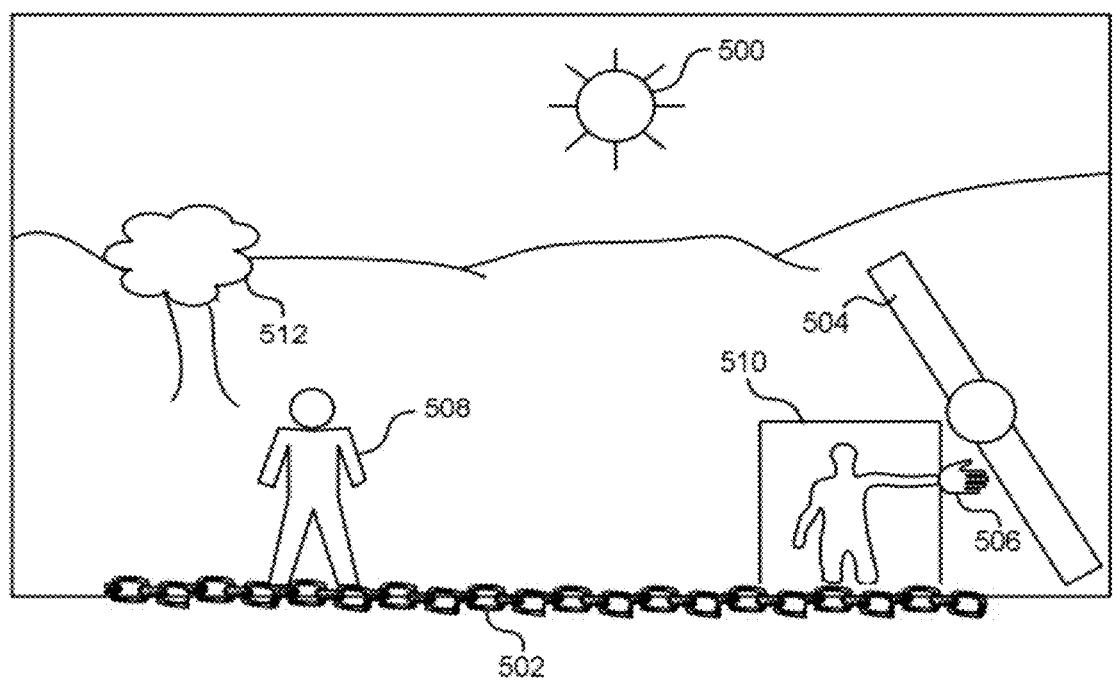
FIG. 5 is a schematic diagram of a display during a first game play.

Reference is now made to FIG. 5, which illustrates a schematic diagram of an example computer game display during game play. The example computer game illustrated in FIG. 5 is able to utilize input from both a manual, hand-held controller (such as that in FIGS. 3 and 4) and motion-based input from a camera (such as the capture device 106).

The example computer game of FIG. 5 comprises an avatar 508 which is the primary game-play element that the user controls using the controller 110. The avatar 508 is located within a game environment comprising active game-play elements, such as rotatable platform 504 and background elements such as tree 512 and sun 500. The example computer game of FIG. 5 also comprises a portal 510, which is a representation of the user based on the stream of images captured by the capture device. This representation can be in the form of a depth image, an RGB image, or a stylized, processed, or colored version of the same. The user can therefore see himself or herself represented in the portal 510. In some examples, the portal 510 can be represented as a TV screen to reflect the display device on which the user is playing the game.

The portal 510 acts as a secondary user-controlled game-play element separate from the avatar 508, and is controlled by the capture device 106. The computer game is configured such that the user can "reach outside" the portal by extending one or more body parts outside of the boundaries shown in the portal 510. When this is performed, a computer-generated representation of the extended body part is displayed, such as computer-generated hand 506 reaching out from the right-hand side of the portal 510 in FIG. 5. The computer-generated representation of the extended body part can be used to interact with game-play elements such as the rotatable platform 504.

When playing the example game in FIG. 5, the user is aiming to enable the avatar 508 to proceed from the left to the right side of the environment. The user can control the avatar 508 directly using the controller 110, for example to move left or right, jump, duck, etc. Substantially concurrently with this, the user can control the portal 510 using movement captured by the capture device 106 in order to facilitate the avatar's progress. For example, in the case of the game shown in FIG. 5, the user is able to reach out from the portal 510 and punch the rotatable platform 504 in order to make it spin such that the avatar 508 can pass it and proceed further with the game.

Further game-play elements can also be present in some examples. For example, chain 502 is shown in FIG. 5, and this can interact with the portal 510. For example, the user can reach out from the portal 510 and grab the chain and pull their hand back towards the portal 510 in order to move the portal 510 across the environment, so that it can be positioned as desired to interact with game-play elements. In another example, the user can move the portal 510 using the chain 502 by reaching out to "grab" the chain then while continuing to reach out, sliding their hand along the chain in the direction opposite the one they want the portal to travel, and then finally (and optionally, as the interaction is now complete) bringing their hand back to a rest position.

Figure 6:
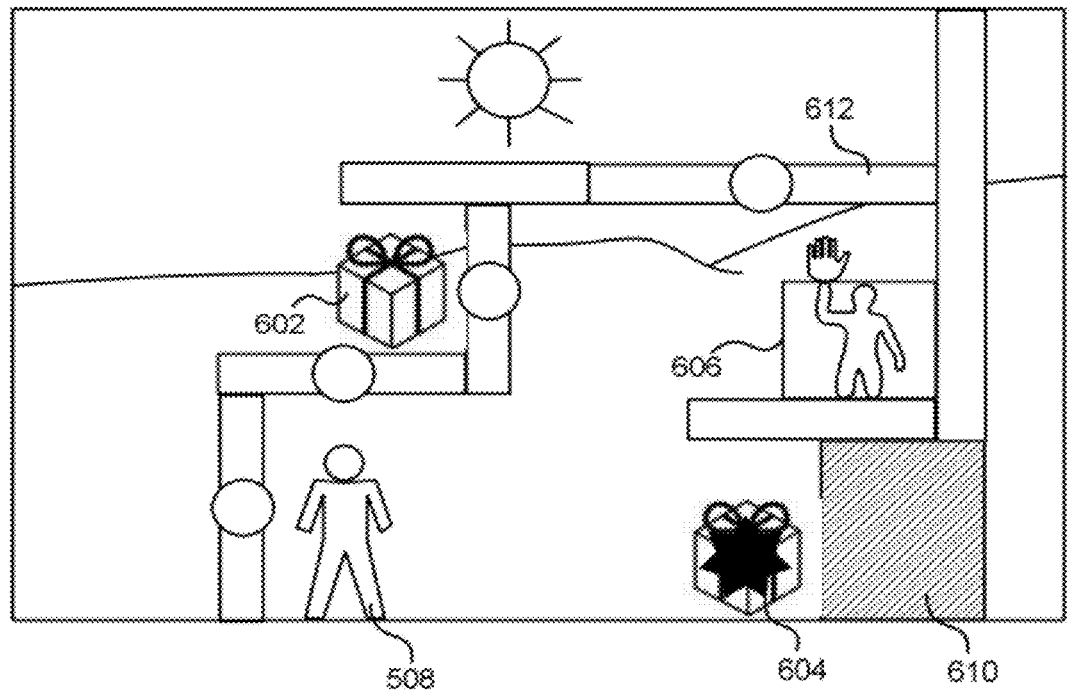
FIG. 6 is a schematic diagram of a display during a second game play.

FIG. 6 shows a schematic diagram of a further example computer game display. In this example, the avatar 508 is in a more complex environment comprising a plurality of platforms and other game-play elements, such as rotatable platform 612 and pushable block 610. In this example, the user can again control the movement of the avatar 508 using the controller 110. In addition, in this example, a plurality of portals are present, which are initially concealed. In this example the portals are shown concealed within presents (such as present 602), although they can be concealed in any suitable manner. The user can reveal a portal by performing a gesture. For example, the user can perform a punch forwards gesture to tear through the present and reveal the portal. This is illustrated in the example of present 604, which has been partially torn to reveal the portal inside. Once a portal has been revealed, such as portal 606, the user can reach out from it to interact with game play elements in the environment, e.g by rotating rotatable platform 612 or sliding pushable block 610, thereby facilitating the avatar's progress through the game.

In further examples, many other different types of interaction are possible between the portal 510, 606 and the game environment. For example, the user can reach out from the portal to punch, pull, push, grab, activate, twist, or pick up in-game elements, or perform any other suitable action.

Figure 7:
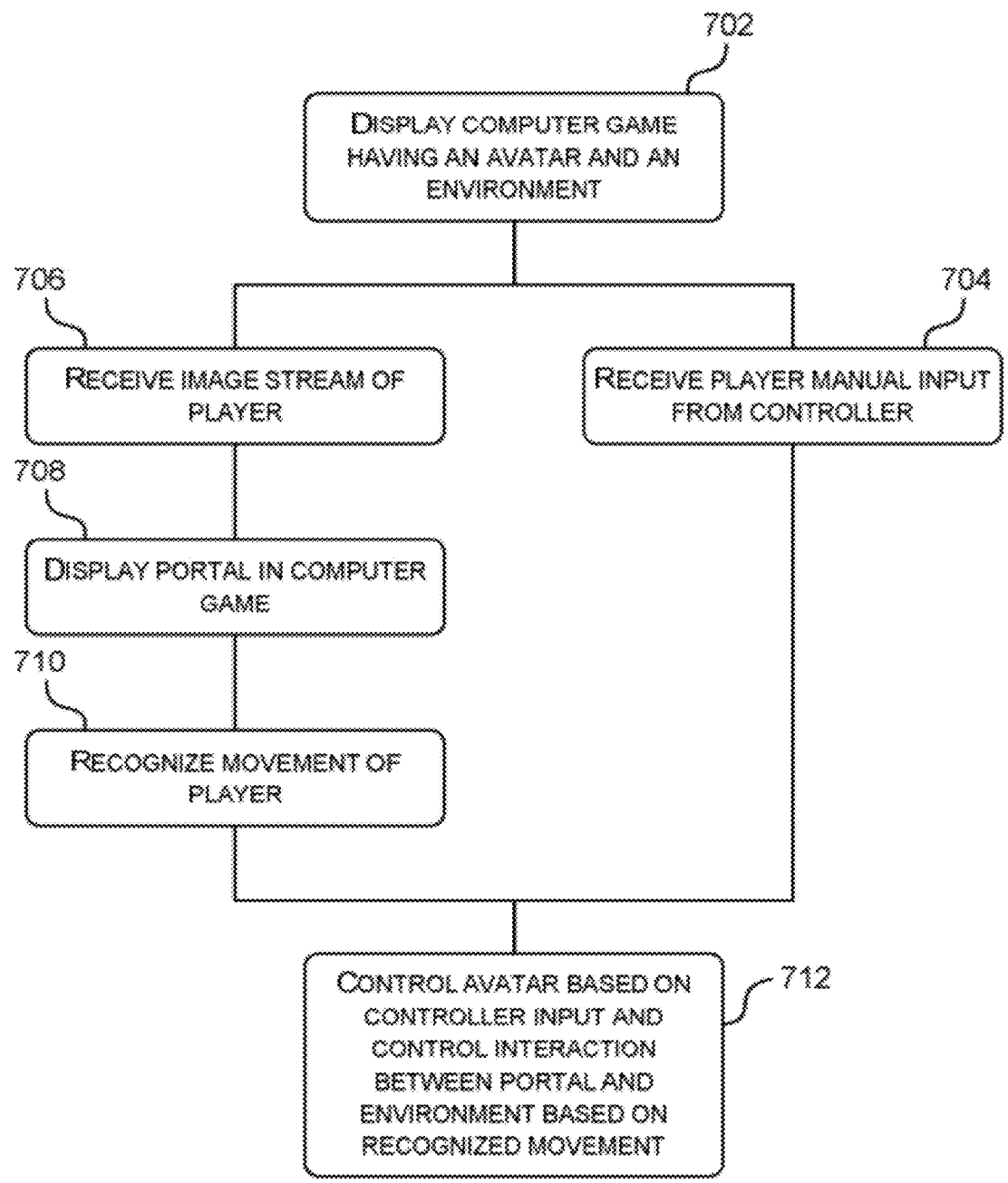
FIG. 7 is a flow diagram of a method of operation of a game system.
Figure 8:
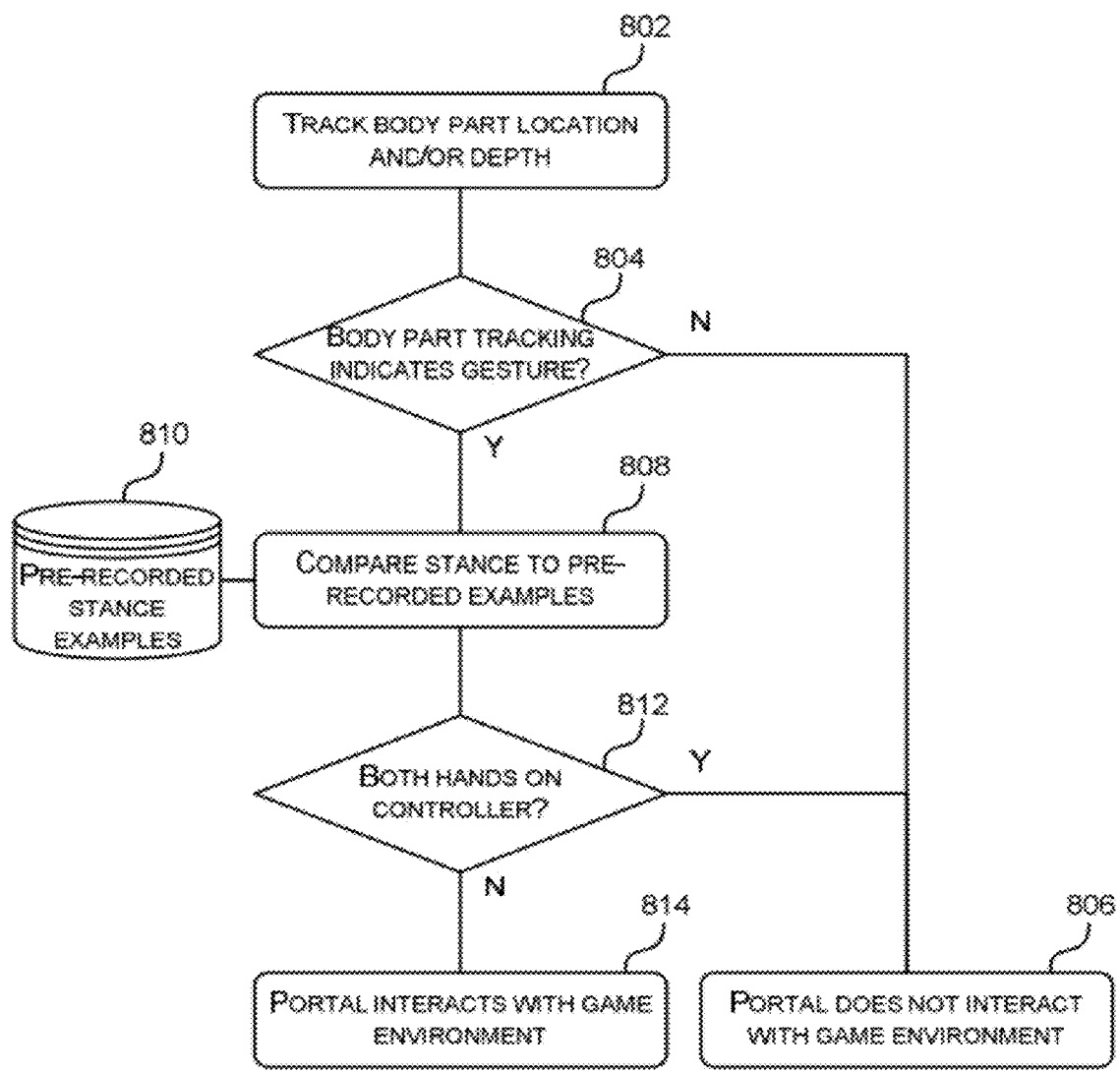
FIG. 8 is a flow diagram of a gesture recognition operation.

Reference is now made to FIGS. 7 and 8, which illustrate flowcharts of processes for controlling the operation of the game with combined controller and motion-based input. Firstly, FIG. 7 shows a flowchart for the overall control of the game operation. The process of FIG. 7 can be performed by the computing device 104 described above. The game display, comprising the avatar and game environment is displayed 702 on the display device 108.

Manual input from a hand-operated controller operated by the user is received 704 at the computing device. Substantially concurrently with this, a stream of images of the user is received 706 from the capture device 106. The stream of images are processed by the computing device and used to display 708 the portal 510, 606 in a portion of the game display. The displayed portal 510, 606 shows at least a portion of the image stream in (at least near) real-time, such that movements of the user can be seen reflected in the portal representation. The computing device can process the image stream to color, stylize, crop, transform, or remove the background from the image stream before displaying it in the portal.

The image stream from the capture device is also processed to recognize 710 movements of the player. For example, the image stream is processed to determine whether the user is reaching out from the portal, or punching forwards to reveal the portal, as mentioned above. This operation is discussed in more detail with reference to FIG. 8 below. The result of the movement recognition is a determination of whether interaction is occurring between the portal and the environment, and, if so, what type of interaction (punch, pull, etc.).

The computing device then controls both the display of the avatar on the basis of the manual input and the displayed interaction between the portal and the environment on the basis of the recognized movement of the player. In other words, two separate game-play entities (the avatar and portal) are separately controlled; both by the same user but using different input methodologies (controller and movement). These two game-playing elements are combined together within a single game to provide an overall game-play experience.

Reference is now made to FIG. 8, which illustrates a flowchart of a process for recognizing a gesture for portal interaction. The process of FIG. 8 can be implemented at the gesture recognition engine 216 of FIG. 2. The body pose estimator 214 discussed above with reference to FIG. 2 is used to track 802 one or more body parts of the user. The body pose estimator 214 comprises a skeletal tracker that can identify body parts and joints and track their location and/or velocity. For example, as described below one or more hands of the user can be tracked. In other examples, different body parts can be tracked, such as the feet, arms, legs or head.

The tracking of the body part or parts is then used to determine 804 whether a gesture is being performed. This can be performed in a number of ways, depending on the gestures that can be used in the game. For example, in the case of the "reaching out" gesture, where the user reaches out from the portal with one or more of their hands, the location of the user's hands can be tracked relative to the boundary of the images from the capture device. If a hand of the user is moved to within a predefined distance of one edge of the image stream, then this triggers a reaching out gesture from the corresponding edge of the portal. In one example, it can be determined whether the user's hand is within a boundary of 10% of the width or height from the edge of the image stream, although other percentage or absolute values can also be used. In a further example, it can be determined whether the user's hand has touched or passed the edge of the image stream. In yet further examples, the velocity of the user's hands can be tracked using the body pose estimator, and this can be used to detect a change in the velocity of a hand (e.g. as the user punches) in the direction of one of the edges of the image stream.

In the case of the punch forwards gesture (e.g. as used to reveal the portal as described with reference to FIG. 6), the body pose estimator can be used to track the depth values of the user's hands using the depth camera 202. The punch forwards gesture can then be detected by determining that the distance between the capture device 106 and the user's hand is less than a predetermined value. In alternative examples, a change of depth for the hand within a predefined time period can be detected, or the velocity of the hand can be tracked and a rapid change in velocity detected.

In further examples, many different types of gestures can be detected by tracking the location, depth, and/or velocity of one or more body parts in the image stream. In further examples, higher-level processing can also be applied to the tracked body parts to detect gestures, such as the use of machine learning classifiers (e.g. decision trees).

If it was determined 804 that no gesture was detected at the current time, then no interaction between the portal and the game environment is displayed 806. The portal still displays the user's movements from the image stream, but no wider interaction with game elements is performed.

Conversely, if it was determined 804 that a gesture was performed by the user, then this indicates that interaction between the portal and the game environment can be controlled. However, prior to displaying the interaction between the portal and the game environment, a further optional check can be performed to ensure that accidental or unintended interactions are not triggered.

To perform the optional additional check, it is determined whether or not the user has both hands on the hand-held controller 110. If the user does have both hands on the controller, then this indicates that the user is not intending to perform a gesture, but may have accidentally triggered it e.g. by moving their hands around when using the controller such that they approached the edge of the image stream, or walked towards the capture device.

In one example, this can be determined by comparing 808 the image of the user to pre-recorded stance examples 810 showing the user holding the controller 110 in both hands. If the image of the user is similar to one or more of these pre-recorded stance examples 810, then this indicates that the user is still holding the controller in both hands. In other examples, this can be determined using the body pose estimator. For example, it can be determined whether both hands are within a predetermined distance of each other (indicating they are both on the controller). The location of the hands can also be compared to other body parts, such as the user's torso, to indicate that both hands are still on the controller. The motion of the user's hands can also be tracked, such that if the user's hands move substantially in sync with each other, then this indicates that they are both holding a common object, such as the controller.

If this optional additional check determines 812 that both hands are holding onto the controller, then this indicates that the gesture triggering was unintended, and no interaction between the portal and the game environment is displayed 806. Conversely, if is the optional check determines 812 that both hands are not on the controller, then this indicates that the gesture was intentional. When a gesture is determined to be intentional, the portal is controlled to interact with the game environment, as outlined above (e.g. by punching out from the sides or top of the portal or revealing a portal).

Figure 9:
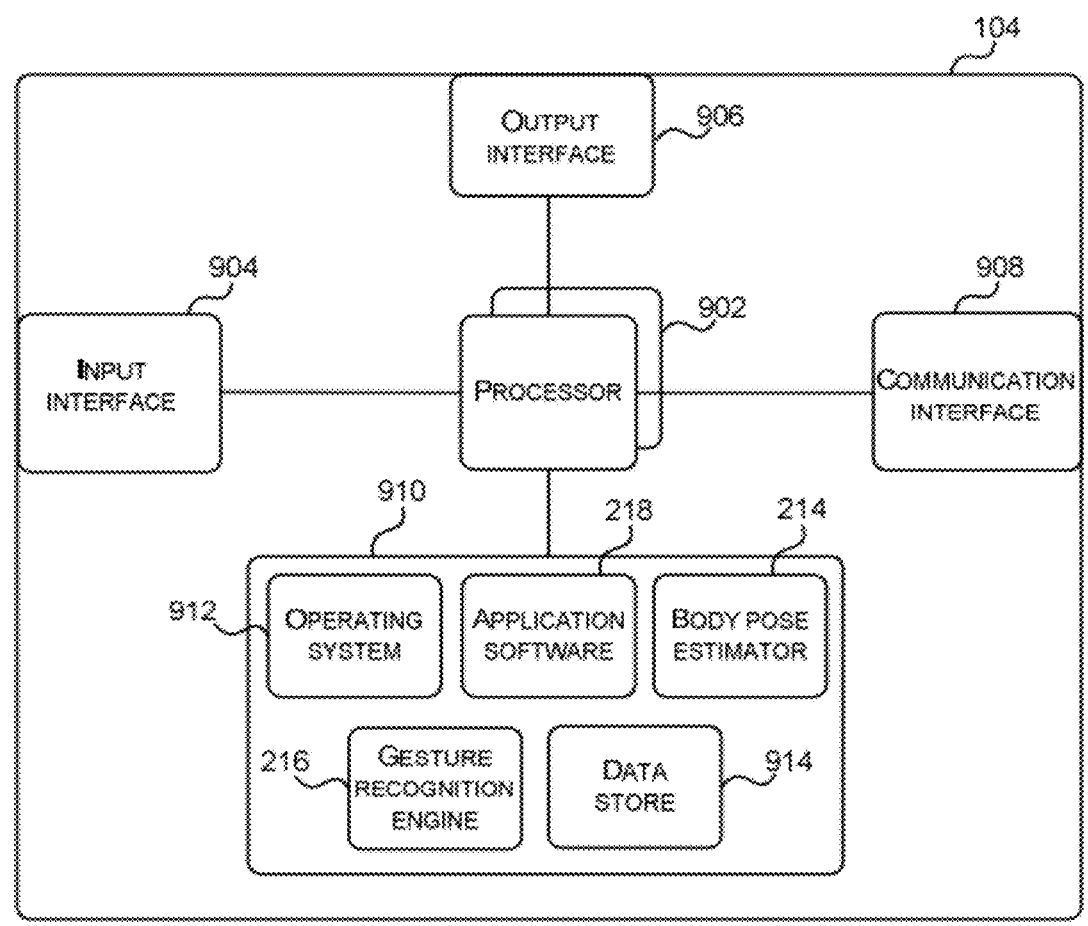
FIG. 9 illustrates an exemplary computing-based device in which embodiments of a game system may be implemented.

FIG. 9 illustrates various components of an exemplary computing device 104 which may be implemented as any form of a computing and/or electronic device, and in which embodiments of the above-described game control techniques may be implemented.

Computing device 104 comprises one or more processors 902 which may be microprocessors, controllers or any other suitable type of processors for processing computing executable instructions to control a game system. In some examples, for example where a system on a chip architecture is used, the processors 902 may include one or more fixed function blocks (also referred to as accelerators) which implement a part of the game control methods in hardware (rather than software or firmware).

The computing-based device 104 also comprises an input interface 904 arranged to receive input from one or more devices, such as the capture device 106 of FIG. 2 and/or the controller of FIG. 3 and FIG. 4. An output interface 906 is also provided and arranged to provide output to, for example, a display system integral with or in communication with the computing-based device (such as display device 108). The display system may provide a graphical user interface, or other user interface of any suitable type although this is not essential. A communication interface 908 may optionally be provided, which can be arranged to communicate with one or more communication networks (e.g. the internet).

The computer executable instructions may be provided using any computer-readable media that is accessible by computing based device 104. Computer-readable media may include, for example, computer storage media such as memory 910 and communications media. Computer storage media, such as memory 910, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 910) is shown within the computing-based device 104 it will be appreciated that the storage may be distributed or located remotely and accessed via a network or other communication link (e.g. using communication interface 908).

Platform software comprising an operating system 912 or any other suitable platform software may be provided at the computing-based device to enable application software 218 to be executed on the device. The memory 910 can store executable instructions to implement the functionality of the body pose estimator 214 and the gesture recognition engine 216. The memory 910 can also provide a data store 914, which can be used to provide storage for data used by the processors 902 when performing the game control techniques, such as for any stance templates, thresholds, parameters, screen space mapping functions, or other data.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling a computer game system comprising:
    displaying a computer game at a display viewable by a user of the game, the display comprising at least one avatar and an environment;
    receiving manual input from a hand-operated controller operated by the user;
    receiving a stream of images from an image capture device depicting the user;
    displaying a portal as part of the displayed computer game, the portal being a region of the display representing the stream of images depicting the user;
    recognizing a gesture of the user by analyzing the stream of images;
    controlling the display of the avatar on the basis of the manual input and controlling displayed interaction between the portal and the environment on the basis of the recognized gesture of the user; and
    one or more of:
        recognizing a gesture of the by analyzing the stream, of images further comprising the recognition being based at least in part on tracking the location of at least one body part of the user in the stream of imaged, determining whether the at least one body part being tracked is located within a predefined portion of the stream of images wherein the predefined portion is a predefined distance from an edge of the stream of images;
        recognizing a gesture of the user further comprising determining whether the user is holding the controller with both hands by comparing the stream of images depicting the user with at least on pre-recorder stance example;
        recognizing a gesture of the user further comprising determining whether the user id holding the controller with both hands by tracking a location for the hands and determining whether they are within a predetermined distance of each other; or
        recognizing a gesture of the user by analyzing the stream of images, determining that the user is reaching out to an edge of the portal, and rendering a representation of a body part of the user outside the edge of the portal.

2. A method as claimed in claim 1, wherein the steps of recognizing the gesture and receiving manual input occur substantially concurrently.

3. A method as claimed in claim 1, wherein the step of recognizing a gesture of the user by analyzing the stream of images comprises tracking at least one body part of the user in the stream of images.

4. A method as claimed in claim 3, wherein the tracking comprises tracking a location for the at least one body part of the user in the stream of images.

5. A method as claimed in claim 4, wherein the step of recognizing a gesture further comprises determining whether the at least one body part being tracked is located within a predefined portion of the stream of images.

6. A method as claimed in claim 5, wherein the predefined portion is a predefined distance from an edge of the stream of images.

7. A method as claimed in claim 6, wherein responsive to determining that the at least one body part being tracked is located within a predefined portion of the stream of images, rendering a computer-generated representation of the at least one body part being tracked outside the portal at a position corresponding to the edge of the stream of images.

8. A method as claimed in claim 7, wherein the step of controlling displayed interaction between the portal and the environment comprises controlling displayed interaction between the computer-generated representation of the at least one body part and the environment.

9. A method as claimed in claim 4, wherein the location tracked for the at least one body part is a distance between the at least one body part and the image capture device.

10. A method as claimed in claim 9, wherein the step of recognizing a gesture further comprises determining whether the distance between the at least one body part and the image capture device is less than a predetermined value.

11. A method as claimed in claim 3, wherein the tracking comprises tracking a motion velocity for the at least one body part of the user in the stream of images.

12. A method as claimed in claim 11, wherein the step of recognizing a gesture further comprises determining whether the at least one body part being tracked has a rate of change of velocity greater than a predetermined value.

13. A method as claimed in claim 3, wherein the at least one body part of the user is the hands of the user.

14. A method as claimed in claim 3, wherein the capture device comprises a depth camera arranged to capture a sequence of depth images of the user, and wherein the step of tracking is performed using a body-pose estimator taking an input from the depth camera.

15. A method as claimed in claim 1, wherein the step of recognizing a gesture comprises determining whether the user is holding the controller with both hands.

16. A method as claimed in claim 15, wherein the step of determining whether the user is holding the controller with both hands comprises comparing the stream of images depicting the user with at least one pre-recorded stance example.

17. A method as claimed in claim 15, wherein the step of determining whether the user is holding the controller with both hands comprises tracking a location for the hands and determining whether they are within a predetermined distance of each other.

18. A computer game system, comprising:
an input interface arranged to receive a stream of images depicting a user from a capture device, and receive manual input commands from a hand-operated controller operable by the user;
an output interface arranged to provide a computer game display to a display device viewable by a user of the computer game system, the computer game display comprising at least one avatar and an environment;
a processor arranged to: control the output interface to display a plurality of portal as including one active portal and at least one inactive portal as part of the computer game display, the active portal being a region of the display representing the stream of images depicting the user, recognizing a gesture of the user by analyzing the stream of images, control the display of the avatar on the basis of the manual input, control displayed interaction between the portal and the environment on the basis of the recognized gesture of the user, and change an inactive portal to an active portal based on a recognized gesture of the user.

19. A system according to claim 18, wherein the capture device comprises a depth camera.

20. A method of controlling a computer game system comprising:
displaying a computer game at a display viewable by a user of the game, the display comprising at least one avatar and an environment;
receiving manual input from a hand-operated controller operated by the user;
at the same time as receiving manual input, receiving a stream of images from an image capture device depicting the user;
displaying a portal as part of the displayed computer game, the portal being a region of the display representing the stream of images depicting the user;
recognizing a gesture of the user by analyzing the stream of images and determining that the user is reaching out to an edge of the portal;
rendering a representation of a body part of the user outside the edge of the portal; and
controlling the display of the avatar on the basis of the manual input and controlling displayed interaction between the representation of the body part and the environment on the basis of the recognized gesture of the user.

* * * * *